(12) United States Patent
Ishizaka

(10) Patent No.: US 10,558,066 B2
(45) Date of Patent: Feb. 11, 2020

(54) LIGHT SHIELDING DEVICE FOR VEHICLE THAT SHIELDS LIGHT FROM OUTSIDE THE VEHICLE

(71) Applicant: HONDA MOTOR CO., LTD., Tokyo (JP)

(72) Inventor: Keita Ishizaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/619,855

(22) Filed: Jun. 12, 2017

(65) Prior Publication Data
US 2017/0363898 A1 Dec. 21, 2017

(30) Foreign Application Priority Data
Jun. 15, 2016 (JP) .................... 2016-118851

(51) Int. Cl.
| | | |
|---|---|---|
| *G02F 1/133* | (2006.01) | |
| *G02F 1/1347* | (2006.01) | |
| *G02F 1/1335* | (2006.01) | |
| *B60J 3/04* | (2006.01) | |
| *G02F 1/137* | (2006.01) | |
| *G02F 1/1333* | (2006.01) | |
| *B60J 3/06* | (2006.01) | |
| *B60J 3/02* | (2006.01) | |

(52) U.S. Cl.
CPC ........ *G02F 1/13318* (2013.01); *B60J 3/0204* (2013.01); *B60J 3/04* (2013.01); *B60J 3/06* (2013.01); *G02F 1/137* (2013.01); *G02F 1/1347* (2013.01); *G02F 1/133308* (2013.01); *G02F 1/133528* (2013.01); *G02F 2203/48* (2013.01)

(58) Field of Classification Search
CPC combination set(s) only.
See application file for complete search history.

(56) References Cited

U.S. PATENT DOCUMENTS

2016/0091786 A1\* 3/2016 Kazmierski .......... H04N 9/3138
353/20

FOREIGN PATENT DOCUMENTS

| JP | S60-52174 U | 4/1985 |
|---|---|---|
| JP | 2002-067690 A | 3/2002 |
| JP | 2002-087060 A | 3/2002 |
| JP | 2002-202486 A | 7/2002 |
| JP | 2008-260430 A | 10/2008 |
| JP | 2009-029245 A | 2/2009 |
| JP | 2016-016805 A | 2/2016 |

OTHER PUBLICATIONS

Japanese Office Action with English translation dated Sep. 17, 2019 (6 pages).

\* cited by examiner

*Primary Examiner* — Lauren Nguyen
(74) *Attorney, Agent, or Firm* — Rankin, Hill & Clark LLP

(57) ABSTRACT

A vehicular sun visor includes a light shielding unit having a plurality of liquid crystal panels each of which enables a transmittance to be changed, and a sensor unit. The sensor unit includes a housing having a front wall part and a rear wall part, a pinhole formed on the front wall part, and a plurality of light receiving elements that are provided on the rear wall part and adapted to receive light passing through the pinhole. The plurality of liquid crystal panels are adapted to change a light transmittance based on light-receiving states of the plurality of light receiving elements each of which is associated with each of the liquid crystal panels.

17 Claims, 14 Drawing Sheets

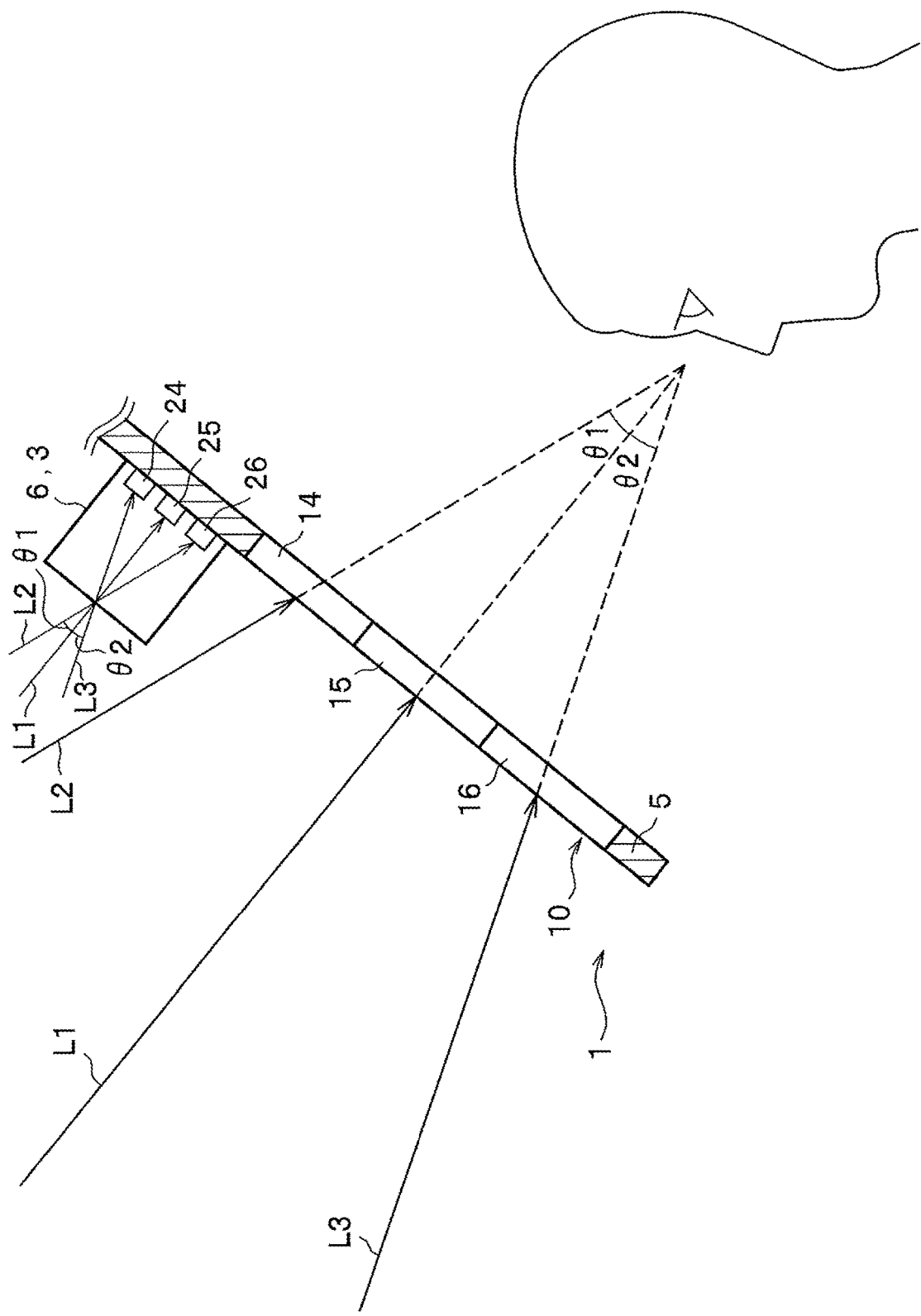

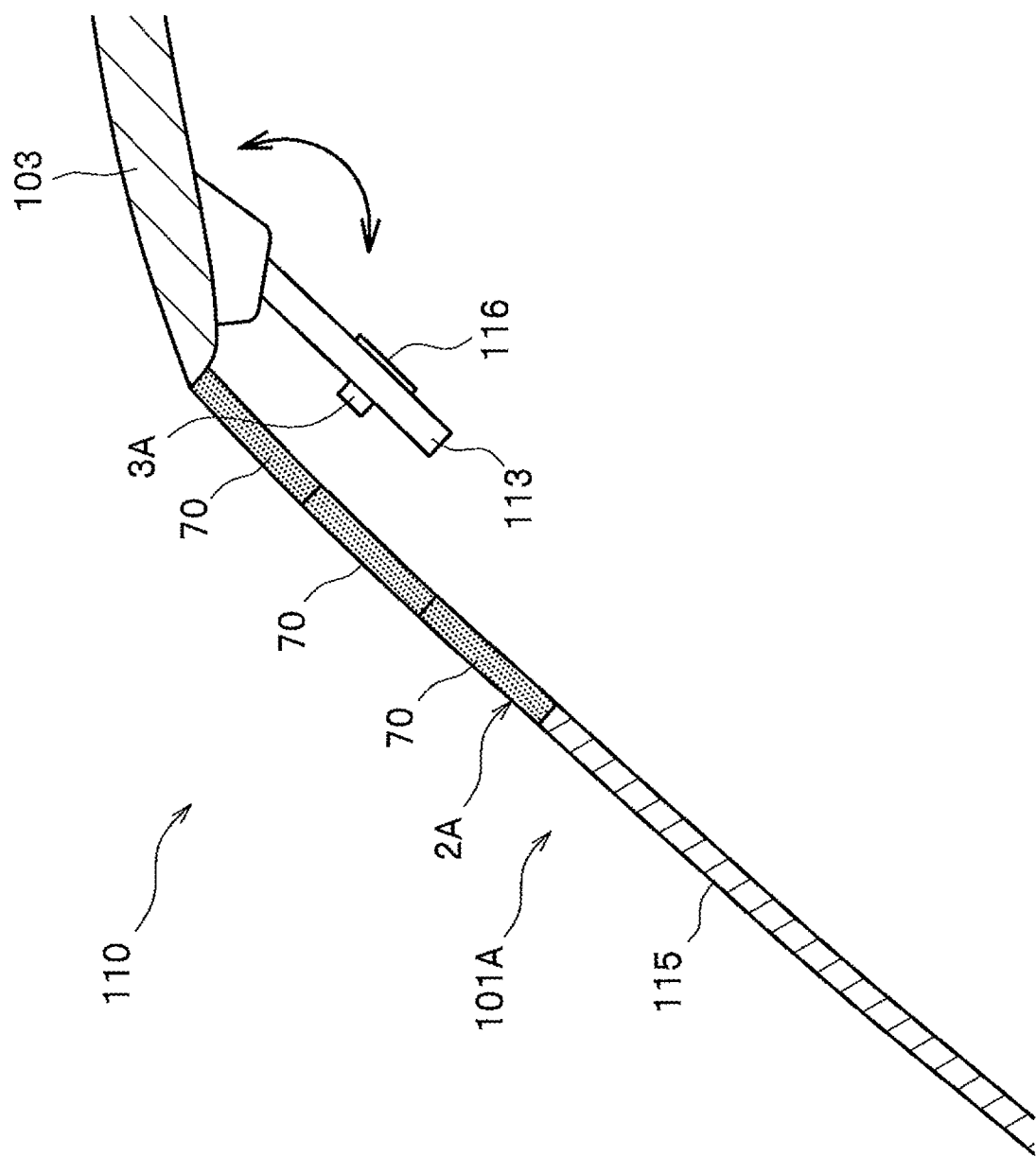

LIGHT SHIELDING DEVICE FOR VEHICLE THAT SHIELDS LIGHT FROM OUTSIDE THE VEHICLE

CROSS-REFERENCE TO RELATED APPLICATION

This application is based upon and claims priority from the Japanese Patent Application No. 2016-118851, filed on Jun. 15, 2016, the entire contents of which are incorporated herein by reference.

BACKGROUND OF THE INVENTION

1. Field of the Invention

The present invention relates to a light shielding device for a vehicle.

2. Description of the Related Art

Examples of a light shielding device for a vehicle that prevents light from entering a front seat of the vehicle include a vehicular sun visor.

Such a vehicular sun visor is generally formed of light non-transmissible material, for example, by coating a plate-like hard resin material with a soft resin material.

In recent years, a light shielding device for a vehicle having the form of a vehicular sun visor has been developed, which is provided with a liquid crystal panel capable of changing a light transmittance thereof, a light receiving element that measures an intensity of light, and a control unit that adjusts (controls) a transmittance of the liquid crystal panel based on results of measurement by the light receiving element.

Such a light shielding device for a vehicle is adapted to decrease a transmittance of the entire liquid crystal panel to block light when the intensity of light is high.

Moreover, from the perspective of securing a front field of view as largely as possible, for example, Patent document 1 (Japanese Unexamined Patent Application Publication No. 2002-087060) proposes a technique of decreasing a transmittance of part of the liquid crystal panel to block only light incident on the crew's eye of light transmitted through the windshield.

The light shielding device for the vehicle disclosed in Patent document 1 is provided with, in addition to the above liquid crystal panel, an eye position detecting unit (imaging device) that detects an eye position of the crew sitting on the front seat, an inclination angle detecting unit (inclinometer) that detects an inclination angle of the vehicle, a calculating unit that calculates an incident angle of a sun light, and a determining unit that determines a portion of the light shielding device through which the sun light incident on the crew's eye passes.

However, the light shielding device for the vehicle disclosed in Patent document 1 requires to be provided with each unit described above and leads to an increase in the number of components and an increase in manufacturing man-hours, thus being not good.

For this reason, development of a light shielding device for a vehicle, capable of appropriately changing a transmittance of the liquid crystal panel with a simple configuration, has been expected.

SUMMARY OF THE INVENTION

The present invention is therefore made in view of the above background, and an object of the invention is to provide a light shielding device for a vehicle, capable of appropriately changing a transmittance of the liquid crystal panel with a simple configuration.

As means for solving the above problems, the present invention provides a light shielding device for a vehicle, including: a light shielding unit having a plurality of liquid crystal panels capable of changing a light transmittance; and a sensor unit that includes: a housing having a front wall part and a rear wall part; a pinhole formed in the front wall part; and a plurality of light receiving elements that are provided on the rear wall part and adapted to receive light passing through the pinhole, wherein the plurality of liquid crystal panels are adapted to change the light transmittance based on light-receiving states of the plurality of light receiving elements that are associated with the liquid crystal panels.

According to the present invention, the light passing through the pinhole enters any light receiving element which is disposed depending on an incident angle of the light, of the plurality of light receiving elements. Then, the liquid crystal panel associated with the light receiving element, in other words, the liquid crystal panel associated with the incident angle of the light is adapted to change a transmittance thereof. Therefore, the transmittance of the liquid crystal panel can be appropriately changed with a simple configuration.

Moreover, the sensor unit has a simple configuration composed of the plurality of light receiving elements and the housing, thus making it possible to avoid an increase in the number of components and an increase in manufacturing man-hours.

Also, the light shielding device for the vehicle according to the present invention may adopt a configuration such that the plurality of light receiving elements and the plurality of liquid crystal panels are disposed with the same number as each other in an up-down direction of the light shielding device, and each of the liquid crystal panels disposed in order from one side in the up-down direction is associated with each of the light receiving elements disposed in order from another side in the up-down direction.

Moreover, the light shielding device for the vehicle according to the present invention may adopt a configuration such that the plurality of light receiving elements and the plurality of liquid crystal panels are disposed with the same number as each other in a right-left direction of the light shielding device, and each of the liquid crystal panels disposed in order from one side in the right-left direction is associated with each of the light receiving elements disposed in order from another side in the right-left direction.

Further, the light shielding device for the vehicle according to the present invention may adopt a configuration such that the light shielding unit is attached to a roof and constitutes a sun visor for the vehicle.

Alternatively, the light shielding device for the vehicle according to the present invention may adopt a configuration such that the light shielding unit is attached on an inside of a supporting frame of a windshield and constitutes a light shielding device for the windshield.

Where the light shielding device for the vehicle constitutes the light shielding device for the windshield, a light shielding range can be enlarged as compared to the vehicular sun visor, thus being good.

Furthermore, in the light shielding device for the vehicle according to the present invention, the sensor unit is preferably attached to a rearview mirror.

According to the present invention, there is no need to attach the sensor unit to the vehicular sun visor, thus making it possible to eliminate the need for the vehicular sun visor.

This makes it possible to reduce troublesomeness which a driver of the vehicle feels for the vehicular sun visor.

The present invention allows a light shielding device for a vehicle to be provided, capable of appropriately changing a transmittance of the liquid crystal panel with a simple configuration.

BRIEF DESCRIPTION OF THE DRAWINGS

FIG. 6 is a first view of correspondence illustrating correspondence relation between a plurality of light receiving elements and a plurality of liquid crystal panels.

FIG. 11 is a side view of a state which is viewed from the left and in which a turning board is turned downward in the light shielding device for the windshield according to the second embodiment.

DETAILED DESCRIPTION OF THE PREFERRED EMBODIMENTS

Description will be given of a light shielding device for a vehicle according to a first embodiment of the present invention. In the first embodiment, description is given of an example in which the light shielding device for the vehicle is applied to a vehicular sun visor.

Note that the vehicular sun visor (the light shielding device for the vehicle) is not limited to being applied to an automobile, but may be applied to a railroad vehicle or the like.

Figure 1:
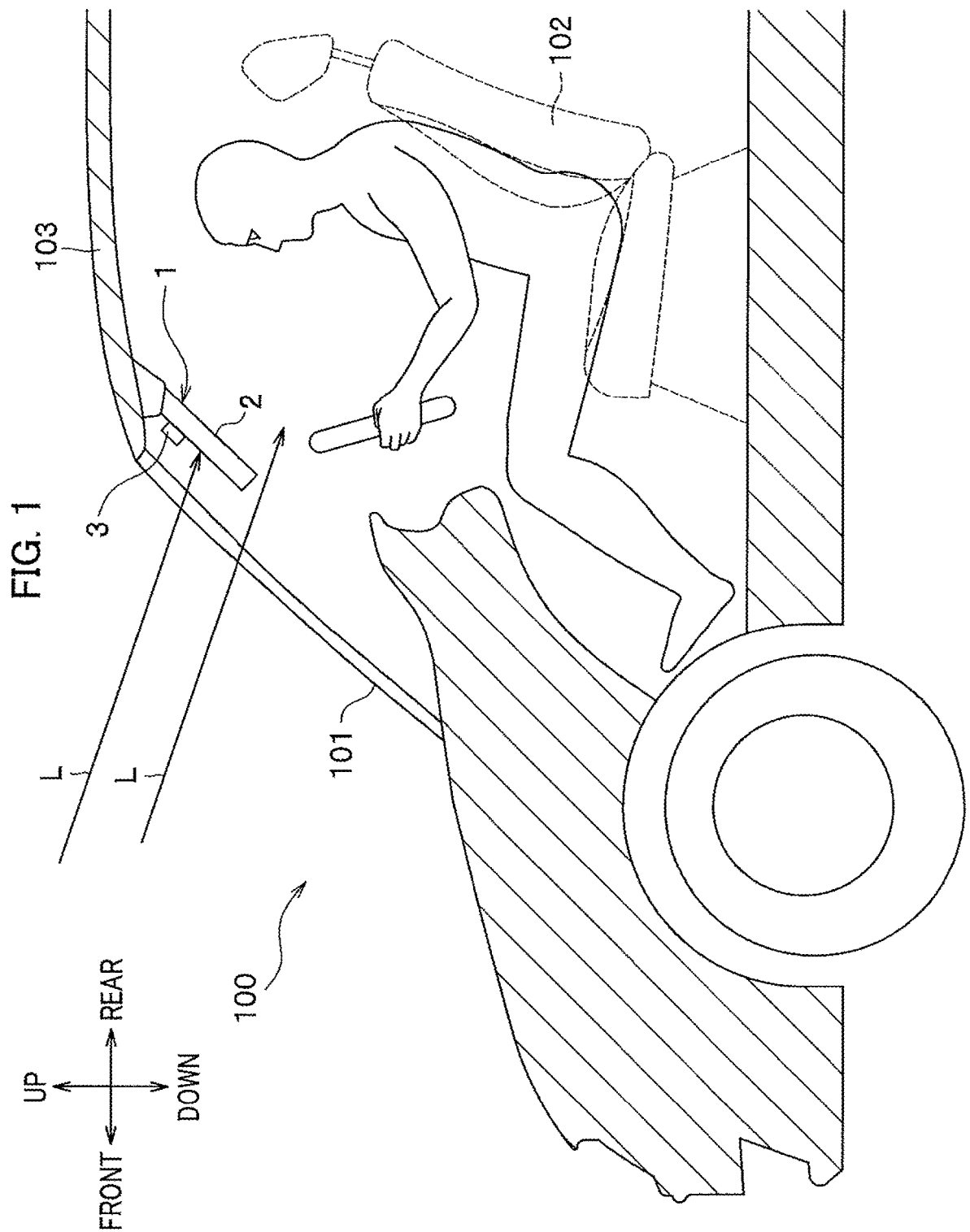
FIG. 1 is a cross-sectional view of an automobile which is viewed in section from the left and to which a vehicular sun visor (a light shielding device for a vehicle) according to a first embodiment of the present invention is applied.

As shown in FIG. 1, the vehicular sun visor (hereinafter abbreviated as a "sun visor") 1 is a board-like member that lies between a windshield 101 and a front seat 102. The sun visor 1 is adapted to block a part of light L transmitted through the windshield 101 to prevent the light L from entering the front seat 102 and a crew sitting on the seat.

Moreover, the sun visor 1 according to the present embodiment is disposed on the inner side of the windshield 101 in a state that follows the windshield 101.

The sun visor 1 is formed to allow a length in the up-down direction thereof to be about one-third of a length in the up-down direction of the windshield 101. Therefore, the sun visor 1 according to the present embodiment blocks only a part of light L transmitted through the upper part side of the windshield 101, of the light L transmitted through the windshield 101.

The sun visor 1 has an upper end thereof attached to a roof 103 so as to be freely turned. Moreover, when turning the sun visor 1 to be flipped up, the sun visor 1 is brought into a state that follows the roof 103. Therefore, when the sun visor 1 is not in use, the sun visor 1 can be disposed outside a field of view of a driver (above the driver).

The sun visor 1 is provided with a light shielding unit 2 adapted to block the light L incident thereon through the upper part side of the windshield 101, a sensor unit 3 provided on a front face of the light shielding unit 2, and a control unit (not shown).

Figure 2:
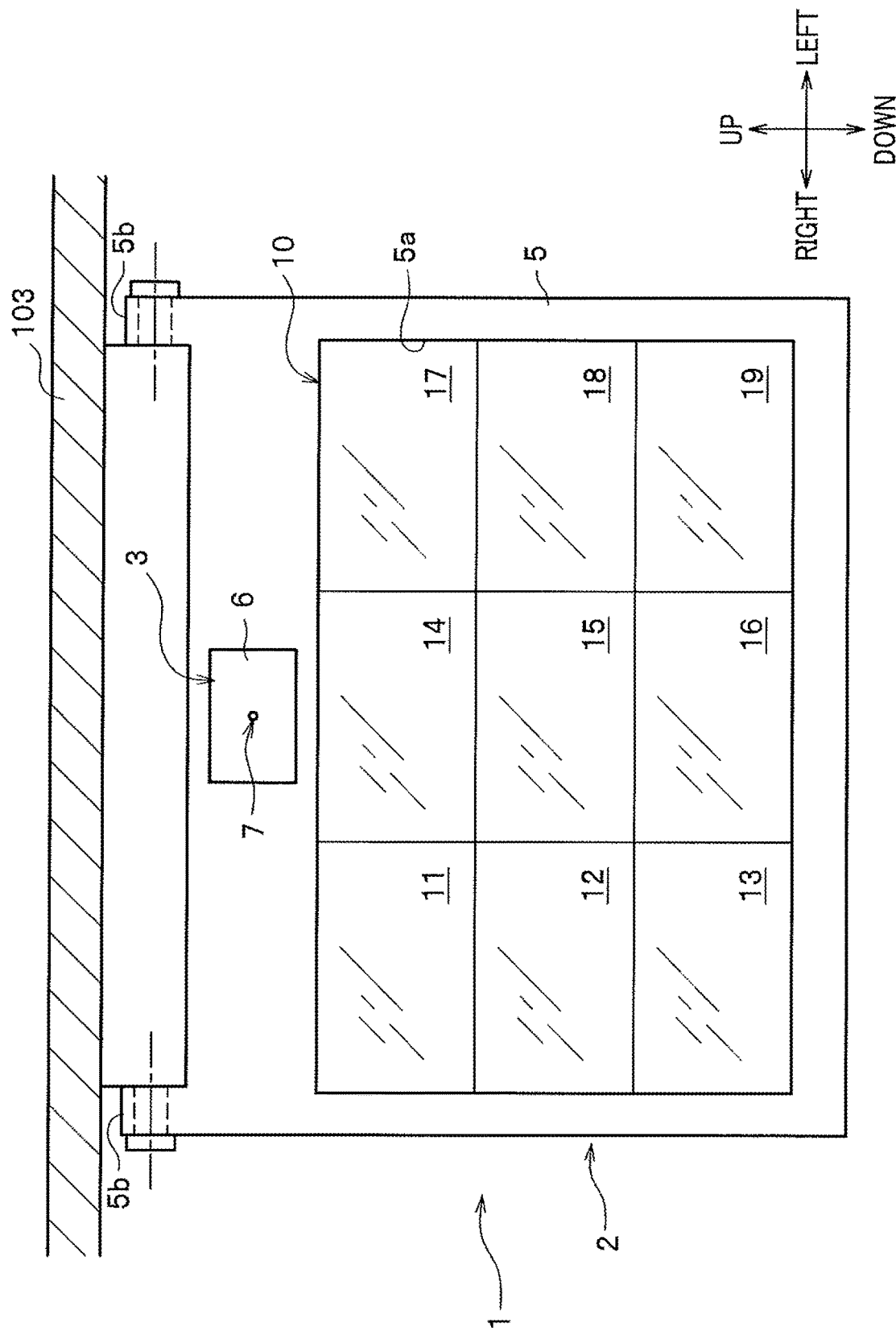
FIG. 2 is a view of the vehicular sun visor which is viewed from the front and above (vertical direction).

FIG. 2 is a view of the sun visor 1 which is viewed from the front and above, in other words, a view of a front face of the sun visor 1 which is viewed from the vertical direction.

As shown in FIG. 2, the light shielding unit 2 is provided with a dimming device 10 that has the form of a rectangle and is capable of adjusting a transmittance, and a rectangular frame 5 having an opening section 5a formed nearly in the central part thereof and adapted to hold the dimming device 10.

The frame 5 is formed by coating a soft resin material on a hard resin material, and adapted to allow light to be not transmitted therethrough. Moreover, formed at both right and left ends of an upper part of the frame 5 are attaching parts 5b, 5b that protrude upward and are attached to the roof 103 so as to be freely turned.

The dimming device 10 is provided with nine liquid crystal panels 11 to 19 that are disposed in the same plane (in the form of a plane). The nine liquid crystal panels 11 to 19 are arranged in three rows in the up-down direction and in three rows in the right-left direction.

Note that, for convenience of explanation below, three liquid crystal panels arranged in the up-down direction in the right row are referred to as, in order from the top, a first liquid crystal panel 11, a second liquid crystal panel 12, and a third liquid crystal panel 13.

Also, three liquid crystal panels arranged in the up-down direction in the central row are referred to as, in order from the top, a fourth liquid crystal panel 14, a fifth liquid crystal panel 15, and a sixth liquid crystal panel 16.

Moreover, three liquid crystal panels arranged in the up-down direction in the left row are referred to as, in order from the top, a seventh liquid crystal panel 17, an eighth liquid crystal panel 18, and a ninth liquid crystal panel 19.

Moreover, when the sun visor 1 is in the state that follows the windshield 101 (see FIG. 1) and as shown in FIG. 6, an incident angle of the light L incident on the sun visor 1 is vertical (90°) to the sun visor 1, the eye point (height position of the driver's eye) is set so that light L1 transmitted through the fifth liquid crystal panel 15 reaches (enters) the driver's eye.

Note that the above height position of the driver's eye is appropriately set, for example, using the eye point setting method prescribed in the Japanese Industrial Standards.

Moreover, as shown in FIG. 6, as for light L2 that is emitted from a light source located at a higher position than alight source of the light L1 and has an incident angle of (90°+θ1°), the setting is carried out so that the light L2 is transmitted through the fourth liquid crystal panel 14 to reach the driver's eye.

On the other hand, as for light L3 having an incident angle of (90°−θ2°), the setting is carried out so that the light L3 is transmitted through the sixth liquid crystal panel 16 to reach the driver's eye.

Figure 7:
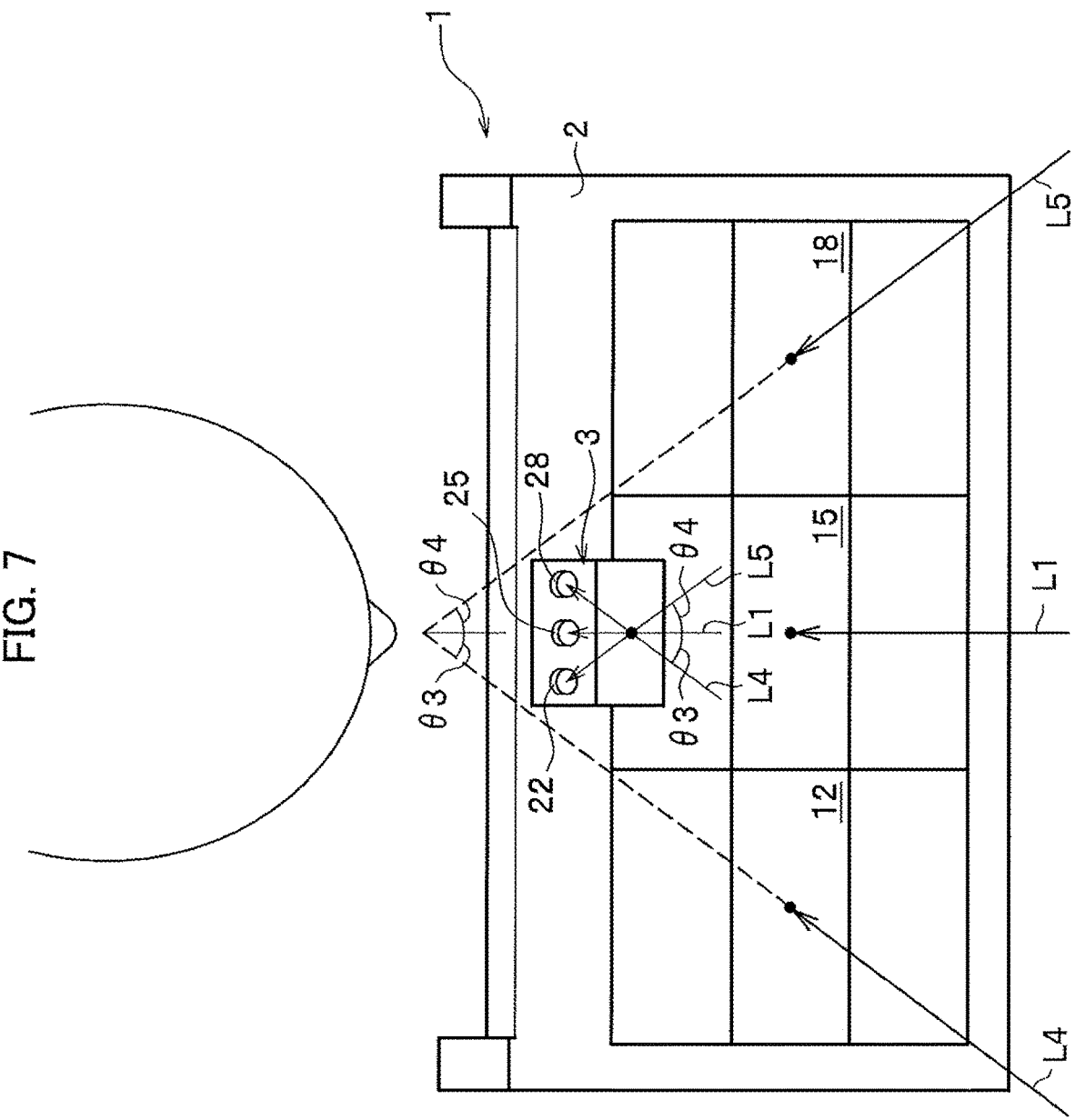
FIG. 7 is a second view of correspondence illustrating correspondence relation between the plurality of light receiving elements and the plurality of liquid crystal panels.

Moreover, as shown in FIG. 7, as for light L4 that is emitted from a light source located at the right side of the light source of the light L1 and has an incident angle of (90°+θ3°), the setting is carried out so that the light L4 is transmitted through the second liquid crystal panel 12 to reach the driver's eye.

On the other hand, as for light L5 having an incident angle of (90°−θ4°), the setting is carried out so that the light L5 is transmitted through the eighth liquid crystal panel 18 to reach the driver's eye.

Figure 3A:
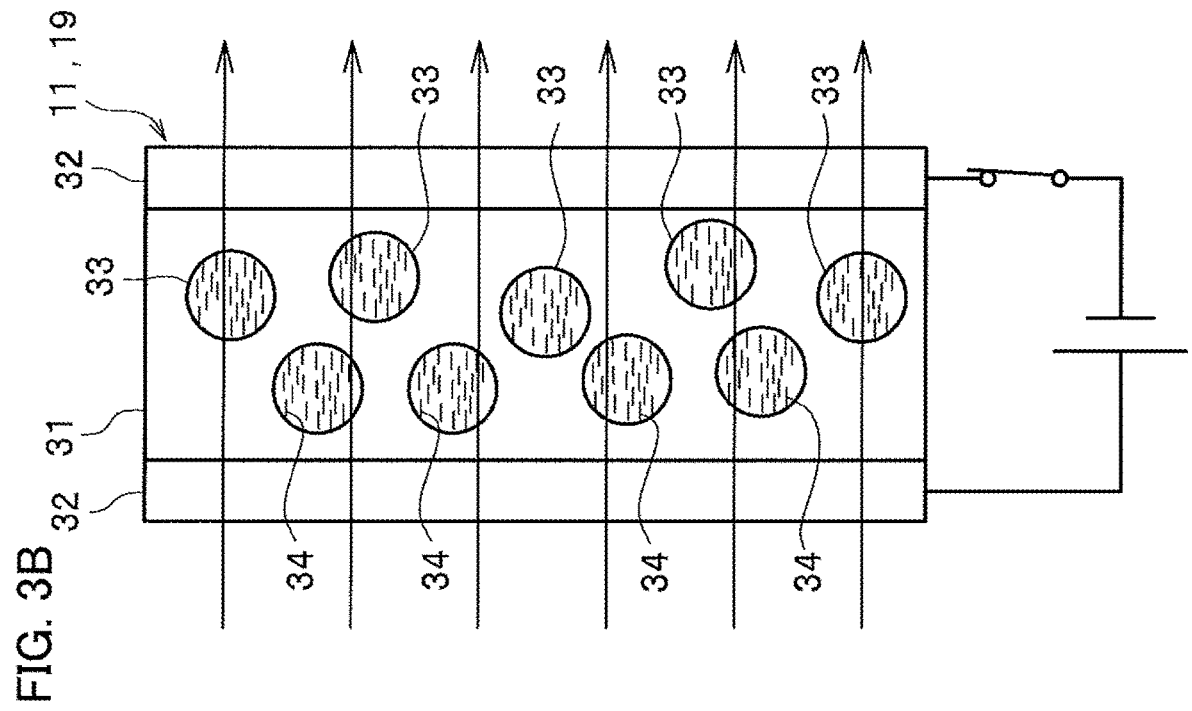
FIG. 3A is a diagram showing a case where no voltage is applied to a liquid crystal panel according to the first embodiment.
Figure 3B:
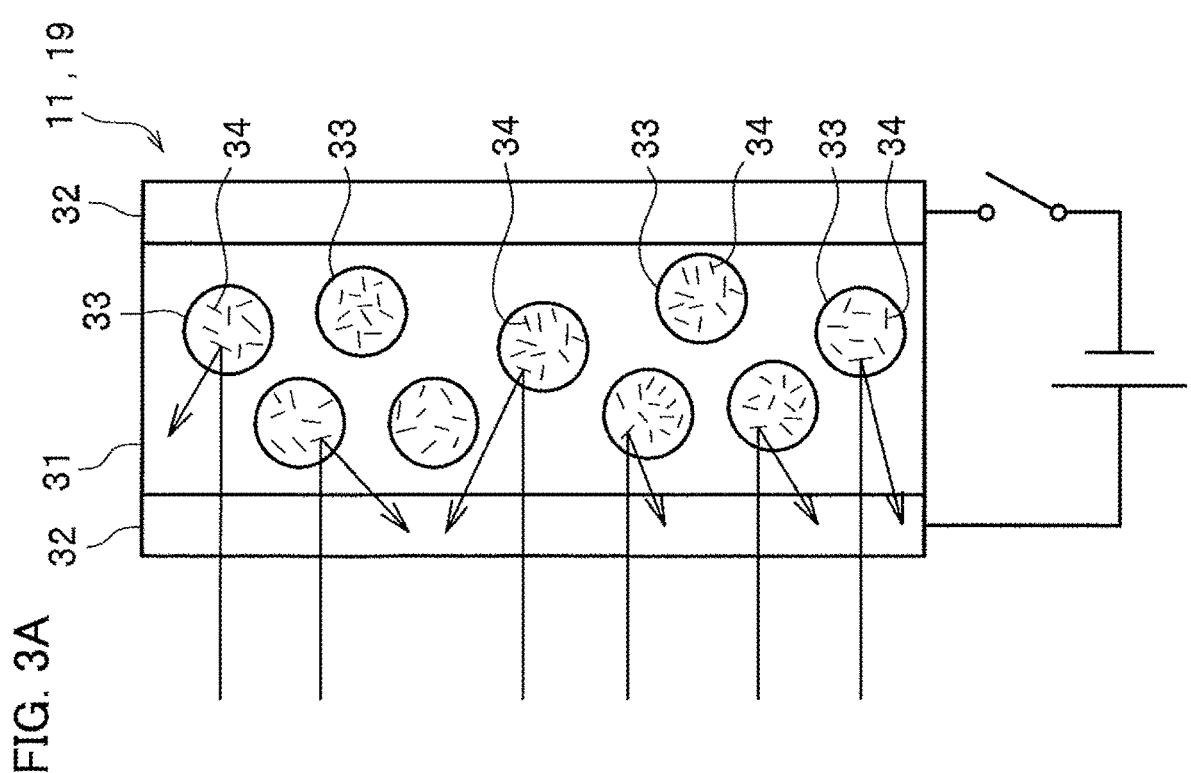
FIG. 3B is a diagram showing a case where a voltage is applied to the liquid crystal panel according to the first embodiment.

As shown in FIG. 3A and FIG. 3B, the liquid crystal panels 11 to 19 according to the present embodiment are each constituted to allow a polymer layer 31 that contains droplets 33 of nematic liquid crystal dispersed therein, to be sandwiched between two transparent conductive films 32.

The liquid crystal panels 11 to 19 are each adapted to allow stick-like liquid crystal molecules 34 to be lined up along an inner wall of each droplet 33 where no voltage is applied thereto. This causes light having entered the polymer layer 31 to be randomly scattered by the liquid crystal molecules 34, thus being not transmitted through the polymer layer 31 (liquid crystal panels). On the other hand, where a voltage is applied to the liquid crystal panels, the liquid crystal molecules 34 are lined up in the direction of the voltage being applied. This causes light having entered the polymer layer 31 to be transmitted through the polymer layer 31 (liquid crystal panels 11 to 19) without being scattered by the stick-like liquid crystal molecules 34.

The sensor unit 3 is fixed to the central part of the upper part of the frame 5 and located above the dimming device 10 (see FIG. 2).

Figure 4A:
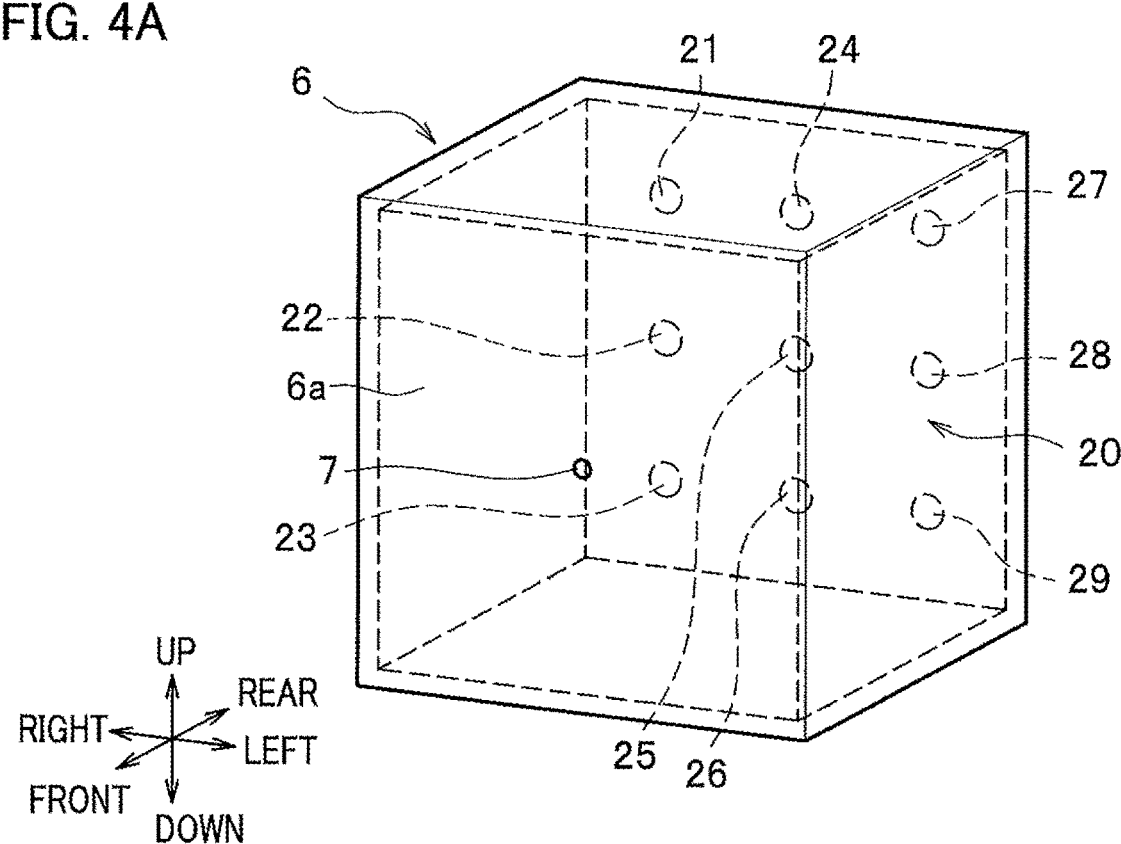
FIG. 4A is a perspective view of a sensor unit according to the first embodiment, which is viewed from the front, left and above.

As shown in FIG. 4A, the sensor unit 3 is provided with a housing 6 having the form of nearly a cube, and a light detecting unit 20 housed in the housing 6.

The housing 6 has a front wall part 6a having a pinhole (needle hole) 7 formed in the center thereof. This allows light incident on the housing 6 from the front side of the housing 6 to pass through the pinhole 7 to be incident on a front face of a rear wall part 6b of the housing 6.

The light detecting unit 20 is provided with nine light receiving elements 21 to 29 that are disposed on the front face of the rear wall part 6b, in other words, in the same plane.

The nine light receiving elements 21 to 29 are elements that convert light incident thereon into electric signals, and the electric signals converted by the nine light receiving elements 21 to 29 are sent to the control unit.

Figure 4B:
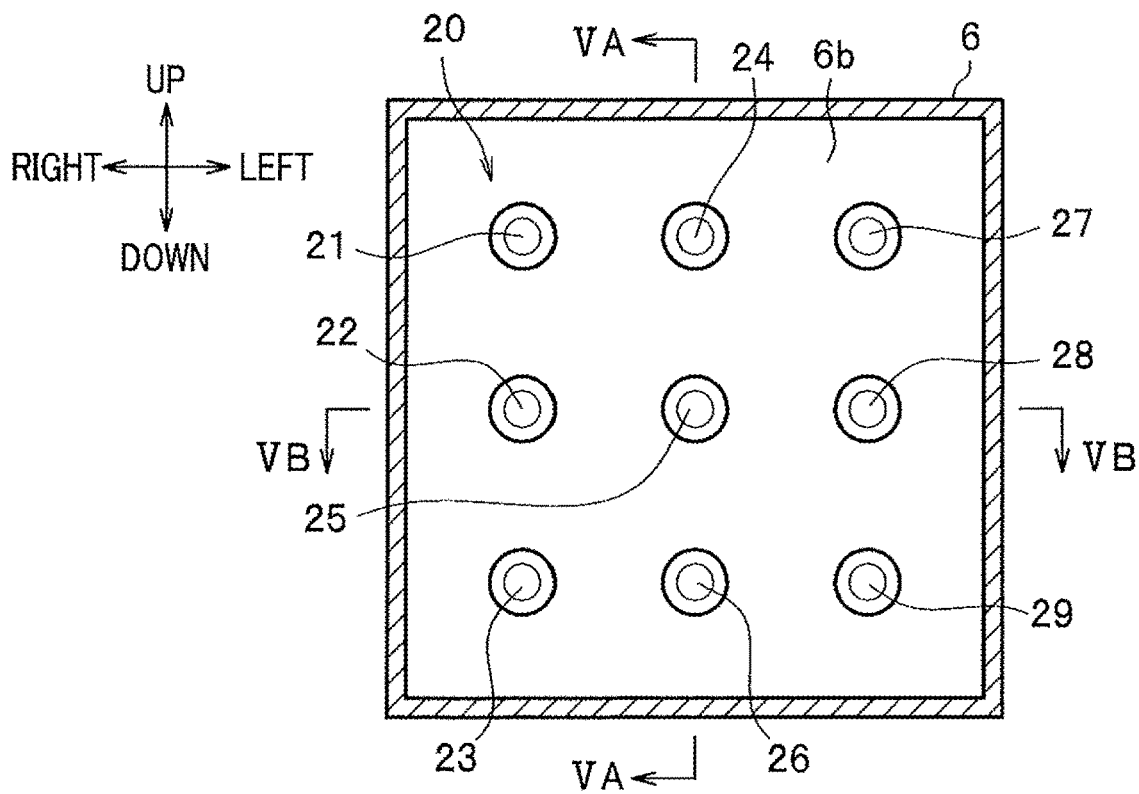
FIG. 4B is a cross-sectional view of a housing of the sensor unit, which is cut in the up-down direction and the right-left direction and viewed from the front.

Also, as shown in FIG. 4B, the nine light receiving elements 21 to 29 are arranged in three rows in the up-down direction and in three rows in the right-left direction.

Note that, for convenience of explanation below, three light receiving elements arranged in the up-down direction in the right row are referred to as, in order from the top, a first light receiving element 21, a second light receiving element 22, and a third light receiving element 23.

Also, three light receiving elements arranged in the up-down direction in the central row are referred to as, in order from the top, a fourth light receiving element 24, a fifth light receiving element 25, and a sixth light receiving element 26.

Moreover, three light receiving elements arranged in the up-down direction in the left row are referred to as, in order from the top, a seventh light receiving element 27, an eighth light receiving element 28, and a ninth light receiving element 29.

Figure 5A:
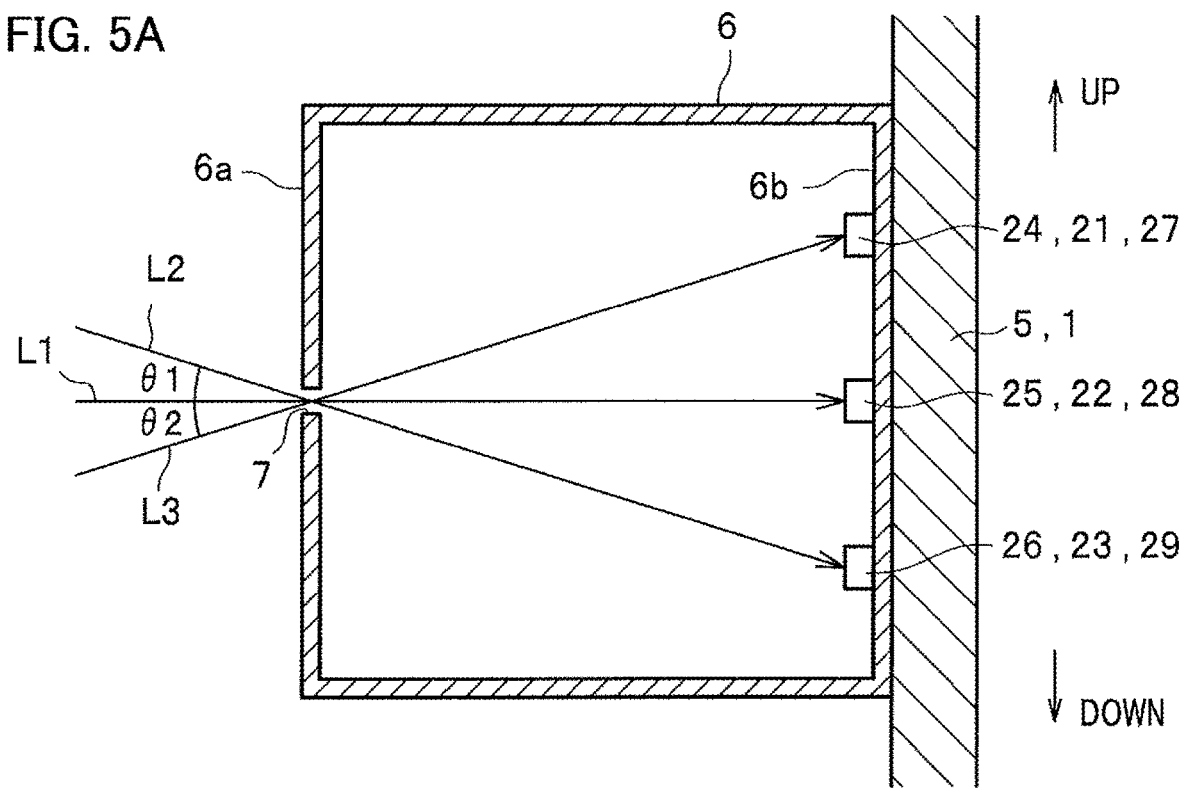
FIG. 5A is a cross-sectional view taken in the arrow direction of the VA-VA line in FIG. 4B.
Figure 5B:
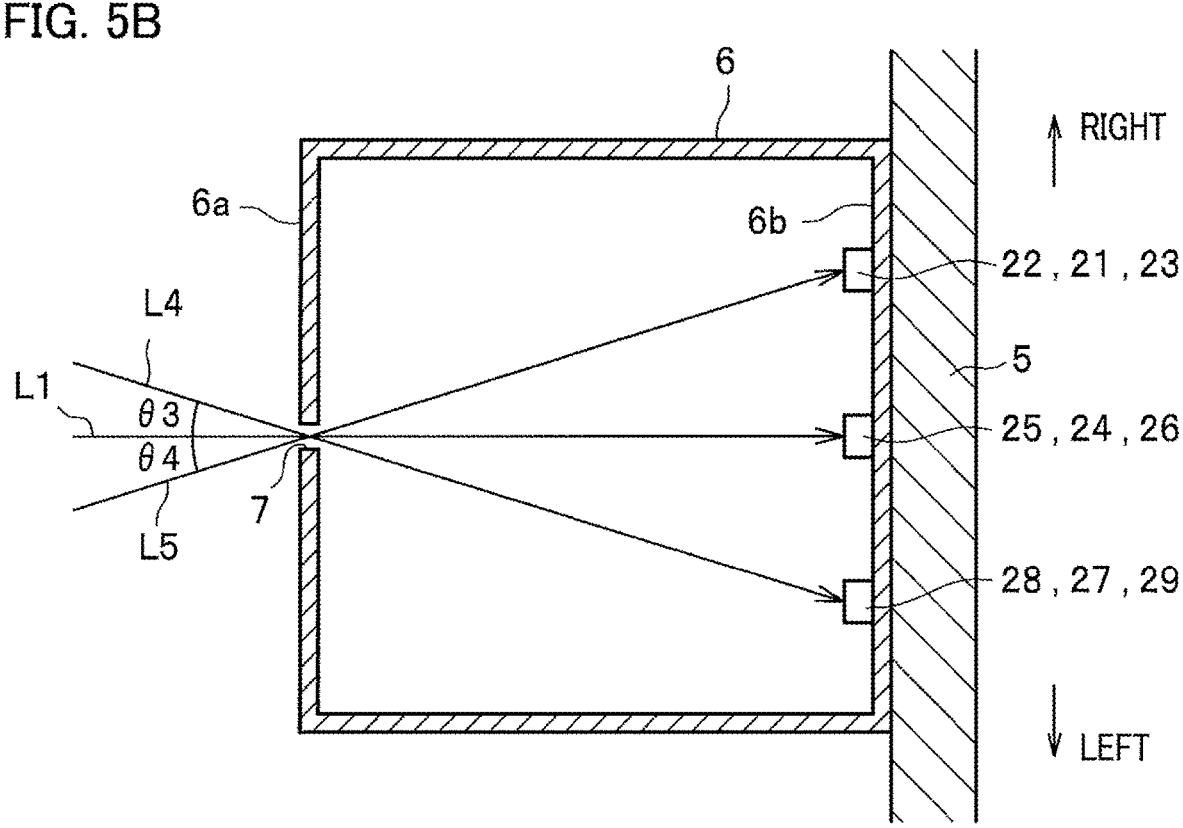
FIG. 5B is a cross-sectional view taken in the arrow direction of the VB-VB line in FIG. 4B.

As shown in FIGS. 5A and 5B, the fifth light receiving element 25 is disposed at a position where the light L1 incident vertically on the sun visor 1 passes through the pinhole 7 to reach the rear wall part 6b of the housing 6.

As shown in FIG. 5A, the sixth light receiving element 26 is disposed at a position where the light L2 (having the incident angle of (90°+θ1°)) passes through the pinhole 7 to reach the rear wall part 6b of the housing 6.

On the other hand, the fourth light receiving element 24 is disposed at a position where the light L3 (having the incident angle of (90°−θ2°)) passes through the pinhole 7 to reach the rear wall part 6b of the housing 6.

As shown in FIG. 5B, the eighth light receiving element 28 is disposed at a position where the light L4 (having the incident angle of (90°+θ3°)) passes through the pinhole 7 to reach the rear wall part 6b of the housing 6.

On the other hand, the second light receiving element 22 is disposed at a position where the light L5 (having the incident angle of (90°−θ4°)) passes through the pinhole 7 to reach the rear wall part 6b of the housing 6.

Further, although simply explained, the first light receiving element 21, the third light receiving element 23, the seventh light receiving element 27 and the ninth light receiving element 29 that are disposed at four corners, of the nine light receiving elements 21 to 29, are adapted to receive light incident obliquely thereon relative to the light L1 from both sides in the up-down direction and the right-left direction.

From the above, the sensor unit 3 in the present embodiment allows the light passing through the pinhole 7 to enter any light receiving element which is disposed depending on the incident angle of the light, of the nine light receiving elements 21 to 29.

Therefore, the incident angle of light incident on the sun visor 1 can be determined by sensing light-receiving states of the light receiving elements.

The control unit (not shown) includes a CPU, a ROM, a RAM, various interfaces, electronic circuits and the like. Moreover, the control unit follows programs stored therein, and when receiving signals from the sensor unit 3, controls the liquid crystal panels 11 to 19 as described below.

When an ignition of an automobile 100 is switched on, the control unit applies voltages to the liquid crystal panels 11 to 19, respectively, and increases transmittances of a plurality of liquid crystal panels 11 to 19. This allows light transmitted through the windshield 101 to reach the front seat 102, thereby making it possible for the driver to recognize signs or the like located above in front of the automobile 100.

Moreover, when the control unit receives an electric signal from the light detecting unit 20, it stops application of the voltage to the liquid crystal panel (one of 11 to 19) associated with the light receiving element (one of 21 to 29) that has output the electric signal, and decreases the transmittance of the liquid crystal panel.

More specifically, when the control unit receives an electric signal from the fifth light receiving element 25, it decreases the transmittance of the fifth liquid crystal panel 15 associated with the fifth light receiving element 25. This allows the light L1 to be blocked by the fifth liquid crystal panel 15, thus allowing the light L1 not to enter the driver's eye.

Also, when the control unit receives an electric signal from the sixth light receiving element 26, it decreases the transmittance of the fourth liquid crystal panel 14 associated with the sixth light receiving element 26. This allows the light L2 (having the incident angle of $(90°+\theta 1°)$) to be blocked by the fourth liquid crystal panel 14, thus allowing the light L2 not to enter the driver's eye.

Moreover, when the control unit receives an electric signal from the fourth light receiving element 24, it decreases the transmittance of the sixth liquid crystal panel 16 associated with the fourth light receiving element 24. This allows the light L3 (having the incident angle of $(90°-\theta 2°)$) to be blocked by the sixth liquid crystal panel 16, thus allowing the light L3 not to enter the driver's eye.

Also, as shown in FIG. 7, when the control unit receives an electric signal from the eighth light receiving element 28, it decreases the transmittance of the second liquid crystal panel 12 associated with the eighth light receiving element 28. This allows the light L4 (having the incident angle of $(90°+\theta 3°)$) to be blocked by the second liquid crystal panel 12, thus allowing the light L4 not to enter the driver's eye.

Moreover, when the control unit receives an electric signal from the second light receiving element 22, it decreases the transmittance of the eighth liquid crystal panel 18 associated with the second light receiving element 22. This allows the light L5 (having the incident angle of $(90°-\theta 4°)$) to be blocked by the eighth liquid crystal panel 18, thus allowing the light L5 not to enter the driver's eye.

As described above, the vehicular sun visor 1 according to the present embodiment allows only the light incident on the driver's eye of the light L incident on the front seat 102 to be blocked, thus making it possible to largely secure a front field of view.

Also, the sensor unit 3 has a simple configuration composed of the plurality of light receiving elements 21 to 29 and the housing 6. Therefore, the need for an inclinometer, an imaging device or the like is eliminated, thus making it possible to avoid an increase in the number of components and an increase in manufacturing man-hours.

Moreover, when the vehicular sun visor 1 according to the present embodiment is used, a tilt angle of the vehicular sun visor 1 is preferably set so as to allow the light L to enter the fifth liquid crystal panel 15 that lies in the central part of the light shielding unit 2.

This allows the light L to be blocked by the first liquid crystal panel 11 to the fourth liquid crystal panel 14 and the sixth liquid crystal panel 16 to the ninth liquid crystal panel 19 that are arranged around the fifth liquid crystal panel 15, even if the position of the sun varies depending on travel motion of the vehicle to allow the incident angle of the light L to be varied, thus making it possible to save the trouble of having to change the tilt angle of the vehicular sun visor 1.

Although the present embodiment has been described above, the present invention is not limited to the example explained in the embodiment. Although the present embodiment is configured to block only light incident on the upper part side of the windshield 101, the present invention may adopt, for example, a configuration such that the light shielding unit 2 covers the entire surface of the windshield 101 so as to allow light incident on the entire surface of the windshield 101 to be blocked.

Moreover, although the present embodiment allows the light receiving elements and the liquid crystal panels to be disposed with the same number (nine) as each other, the present invention may allow the number of light receiving elements to be different from the number of liquid crystal panels.

For example, a configuration may be adopted such that the number of the liquid crystal panels is made more than that of the light receiving elements and a plurality of liquid crystal panels associated with one light receiving element change respective light transmittances.

Moreover, although in the present embodiment, description has been given of the example in which the light L passing through the pinhole 7 enters only any one of the plurality of light receiving elements 21 to 29, the present invention may adopt a configuration such that the light enters two neighboring light receiving elements (for example, the fourth light receiving element 24 and the fifth light receiving element 25, or the sixth light receiving element 26 and the ninth light receiving element 29) of the plurality of light receiving elements 21 to 29. Then, the control unit may decrease transmittances of two liquid crystal panels so as to be associated with two light receiving elements that detect incidence of the light.

Furthermore, although the present embodiment adopts the configuration such that when the control unit receives electric signals from the light receiving elements 21 to 29, it decreases transmittances of the liquid crystal panels 11 to 19, for example, a configuration may be adopted such that only when the control unit receives electric signals each exceeding a set threshold value, it decreases the transmittances of the liquid crystal panels 11 to 19. This allows light to be blocked when an intensity of the light is high, in other words, only when the electric signal sent from the light receiving element is high in level.

In addition, the liquid crystal panels used in the present invention only need to block light and thus is not limited to the liquid crystal panels 11 to 19 explained in the embodiment.

Figure 8A:
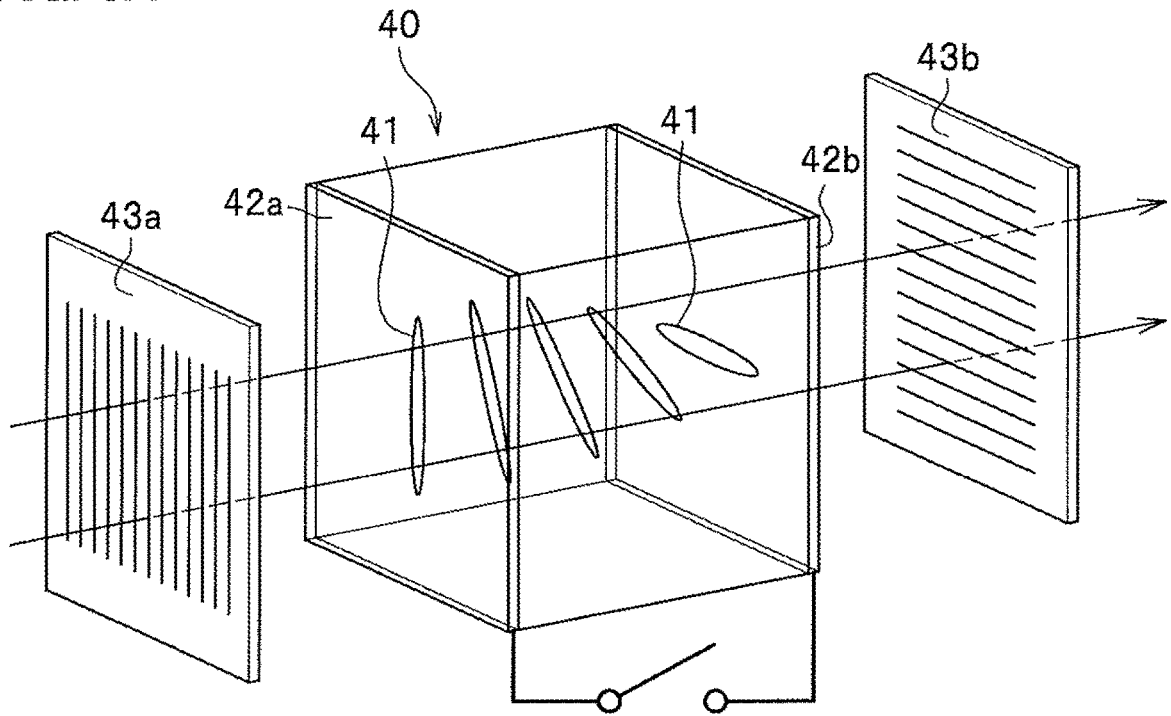
FIG. 8A is a diagram showing a case where no voltage is applied to a liquid crystal panel according to a modified example of the first embodiment.
Figure 8B:
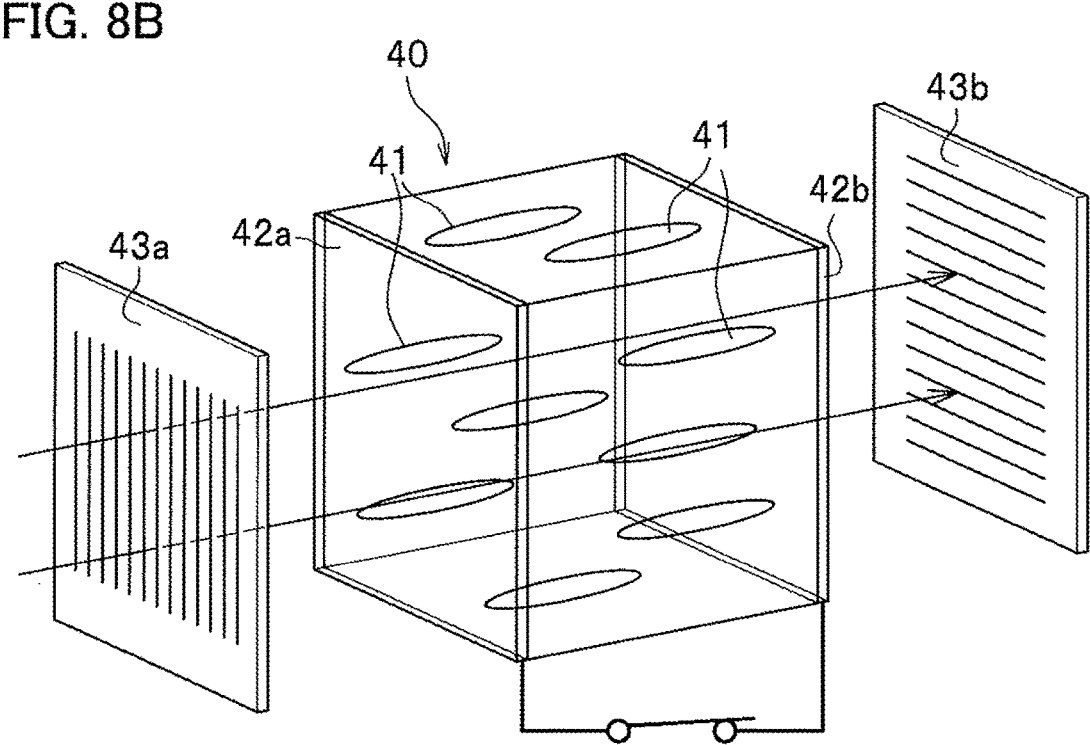
FIG. 8B is a diagram showing a case where a voltage is applied to the liquid crystal panel according to the modified example of the first embodiment.

As shown in FIGS. 8A and 8B, a liquid crystal panel 40 may be used which is provided with two oriented films (not shown) that sandwich stick-like liquid crystal molecules 41 therebetween, two transparent conductive films 42a, 42b that sandwich the oriented films therebetween, and two polarizing plates 43a, 43b that are disposed on outer sides of the transparent conductive films 42a, 42b. Also, one polarizing plate 43a is adapted to allow only light oscillating longitudinally to be transmitted therethrough, and the other polarizing plate 43b is adapted to allow only light oscillating transversely to be transmitted therethrough.

The liquid crystal panel 40 is adapted to allow the liquid crystal molecules 41 to be arranged in a spiral manner between the two oriented films where no voltage is applied thereto. This causes light having been transmitted through the one polarizing plate 43a to allow its direction of oscillation to be twisted by 90 degrees by the liquid crystal molecules 41, thus oscillating transversely. Consequently, the light is transmitted through the other polarizing plate 43b.

On the other hand, where a voltage is applied to the liquid crystal panel, the liquid crystal molecules 41 are arranged in the direction of the voltage being applied and thus the direction of oscillation of the light is not twisted. Consequently, the light is not transmitted through the other polarizing plate 43b and thus is blocked.

Figure 9:
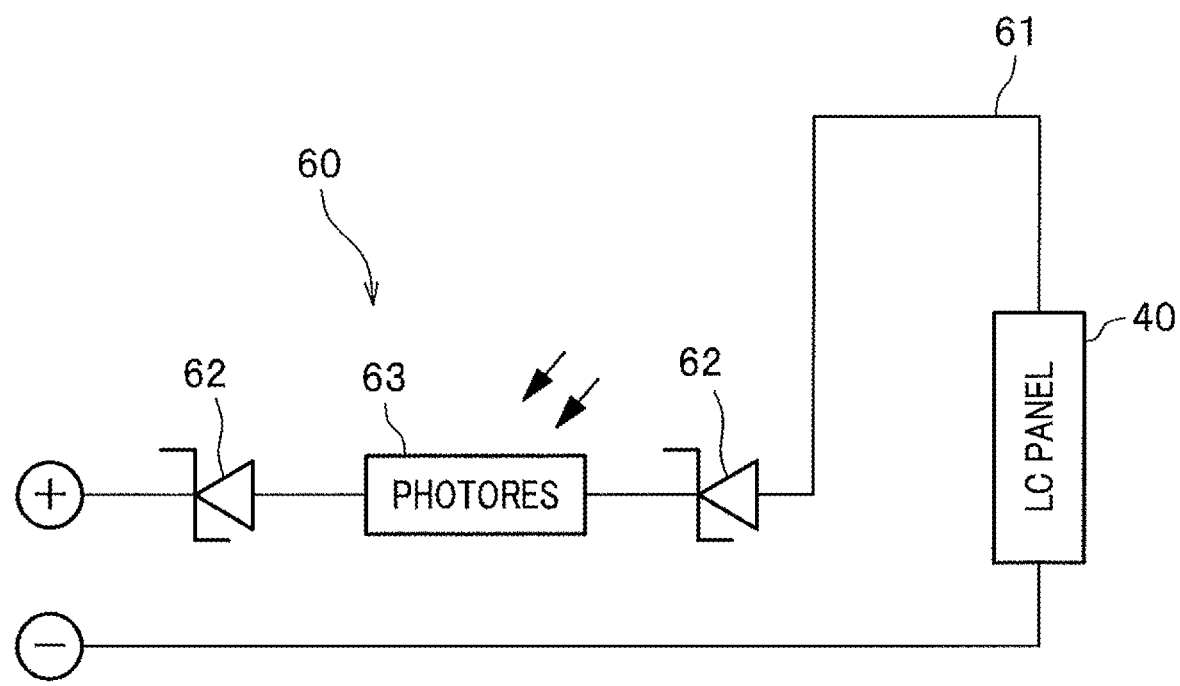
FIG. 9 is a circuit diagram showing an electrical circuit according to the modified example of the first embodiment.

Moreover, although the present embodiment allows the control unit constituted by a CPU and the like to adjust (control) the transmittances of the liquid crystal panels 11 to 19, an electrical circuit 60 such as shown in FIG. 9 may be provided in each of the liquid crystal panels 11 to 19 to adjust (control) the transmittances of the liquid crystal panels 11 to 19. Note that when the electrical circuit 60 is used, it is necessary to use the liquid crystal panel 40 provided with the two polarizing plates 43a, 43b described in the above modified example.

Details of the electrical circuit 60 are as follows: two Zener diodes 62, 62 are disposed on a wiring 61 that connects a positive terminal of the liquid crystal panel 40 with a power source (not shown), and a photoresistor 63 is disposed between the two Zener diodes 62, 62.

Note that the photoresistor 63 is equivalent to one of the plurality of light receiving elements 21 to 29 in the present invention.

The electrical circuit 60 allows an electrical resistance of the photoresistor 63 to be decreased when an intensity of light incident on the photoresistor 63 (light receiving elements 21 to 29) is increased. Consequently, a voltage applied to the two Zener diodes 62, 62 is increased to allow current to flow.

This causes the current to flow into the liquid crystal panel 40 from the power source, and the liquid crystal molecules 41 in the liquid crystal panel 40 are arranged in the direction of the voltage being applied and thus the light is blocked (see FIG. 8B).

The modified example thus configured makes it possible to achieve a reduction in power consumption because the current flows only when the light is blocked. Moreover, even if the power is lost, a field of view of the driver can be secured because the light is transmitted through the liquid crystal panel 40.

Next, description will be given of a second embodiment of the present invention. In the second embodiment, description is given of an example in which the light shielding device for the vehicle is applied to a light shielding device 110 for a windshield.

Figure 10:
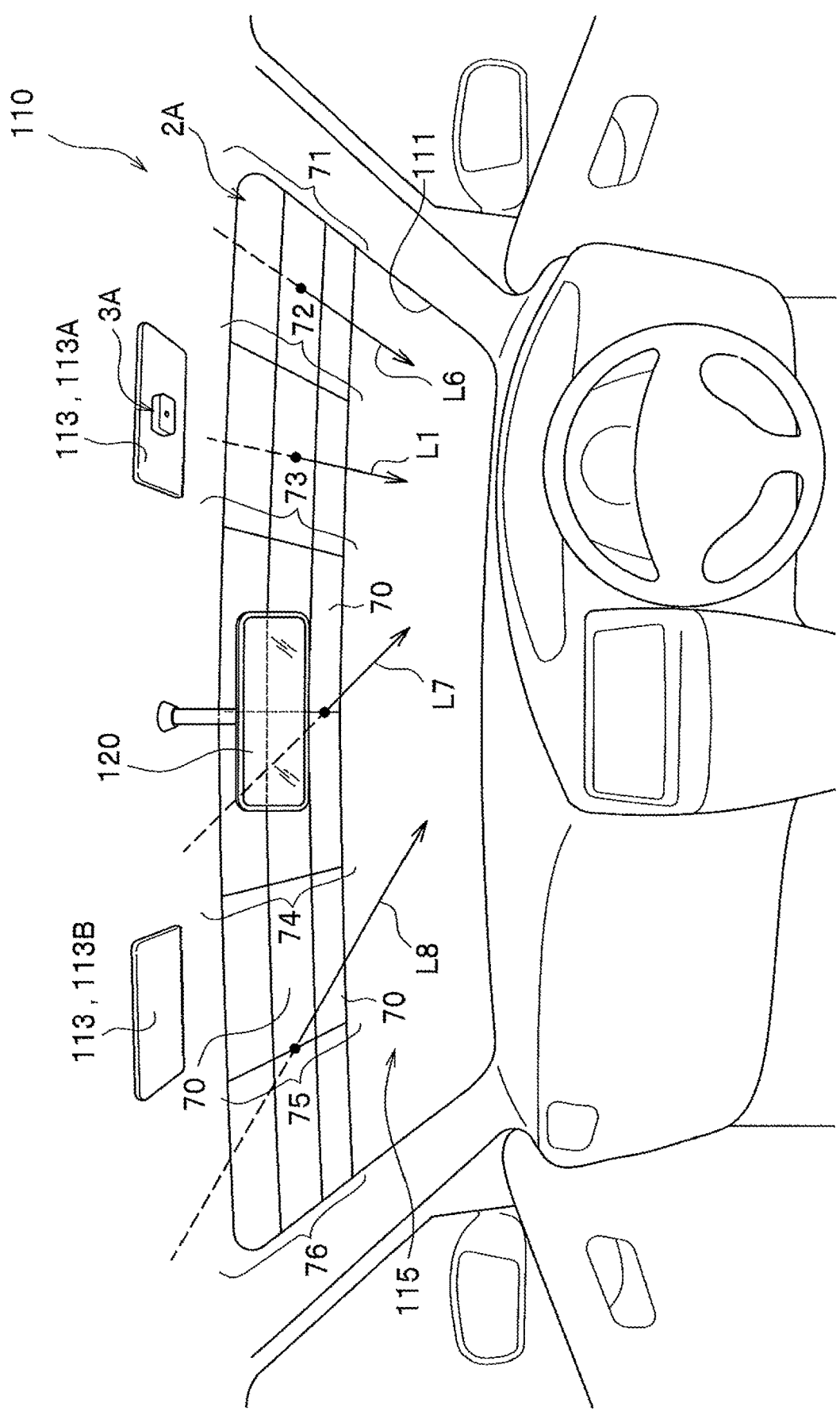
FIG. 10 is a view of a light shielding device for a windshield (a light shielding device for a vehicle) according to a second embodiment of the present invention, which is viewed from the vehicle interior side.

As shown in FIG. 10, the light shielding device 110 for the windshield is provided with a light shielding unit 2A constituting an upper half of a supporting frame 111 of the windshield, and a sensor unit 3A provided on a turning board 113.

In the second embodiment, the windshield 101A (see FIG. 11) is composed of the light shielding unit 2A, and an ordinary glass board 115 constituting a lower half of the supporting frame 111 of the windshield.

The light shielding unit 2A is composed of eighteen liquid crystal panels 70 that are disposed in the same plane (in the form of a plane). The eighteen liquid crystal panels 70 are arranged in three rows in the up-down direction and in six rows in the right-left direction.

Note that, for convenience of explanation, groups each composed of a set of three liquid crystal panels 70 arranged in the up-down direction are referred to as, in order from the right, a first row 71 of group of liquid crystal panels, a second row 72 of group of liquid crystal panels, a third row 73 of group of liquid crystal panels, a fourth row 74 of group of liquid crystal panels, a fifth row 75 of group of liquid crystal panels, and a sixth row 76 of group of liquid crystal panels.

As shown in FIG. 11, the turning board 113 is a board-like member attached to the roof 103 so as to be freely turned, and is for holding a mirror 116 thereon.

Although a conventional sun visor is formed in a relatively large size so as to prevent light from entering a driver's eye, the second embodiment allows the light shielding unit 2A to be adapted to block light, thus allowing the turning board 113 to be downsized as compared to the conventional sun visor and not to have a light shielding function.

In addition, the turning board 113 is provided with a first turning board 113A located above the driver's seat, and a second turning board 113B located above the front passenger seat.

The sensor unit 3A is provided on the first turning board 113A located above the driver's seat.

Moreover, the sensor unit 3A is provided with a housing 6A having a pinhole 7A formed therein, and a light detecting unit 10A, in the same manner as the sensor unit 3 in the first embodiment.

Figure 12A:
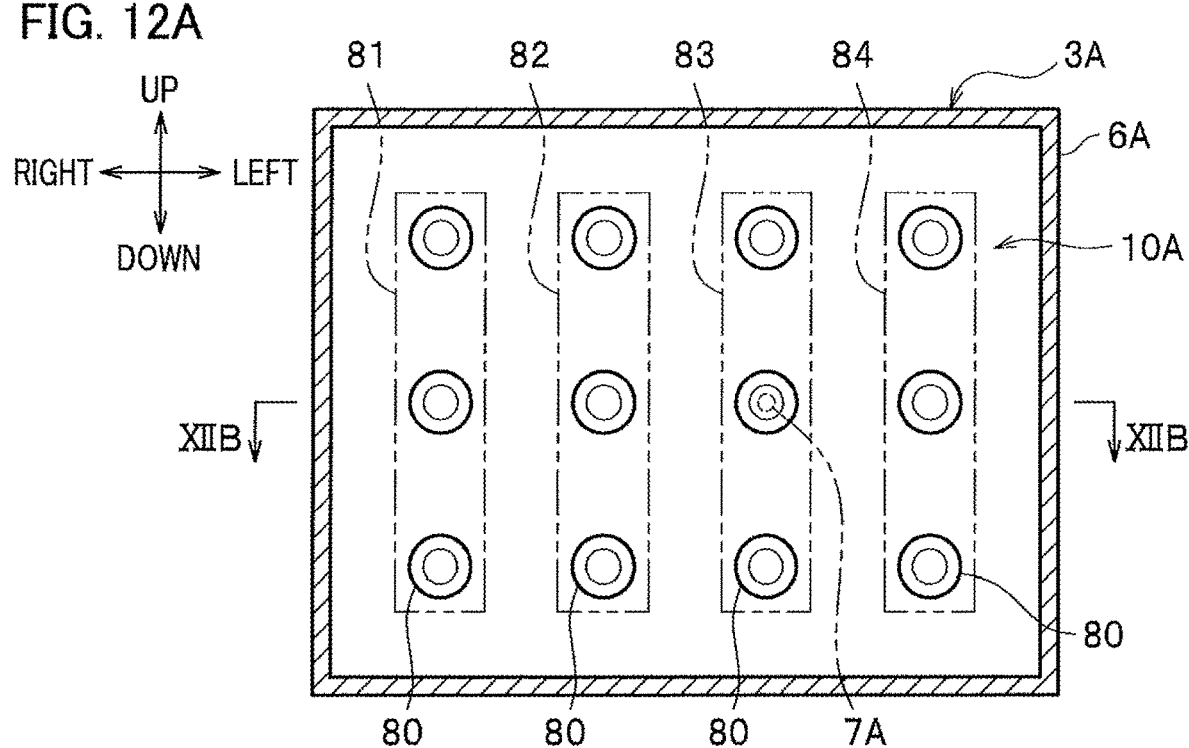
FIG. 12A is a cross-sectional view of a housing of a sensor unit according to the second embodiment, which is cut in the up-down direction and the right-left direction and viewed from the front.
Figure 12B:
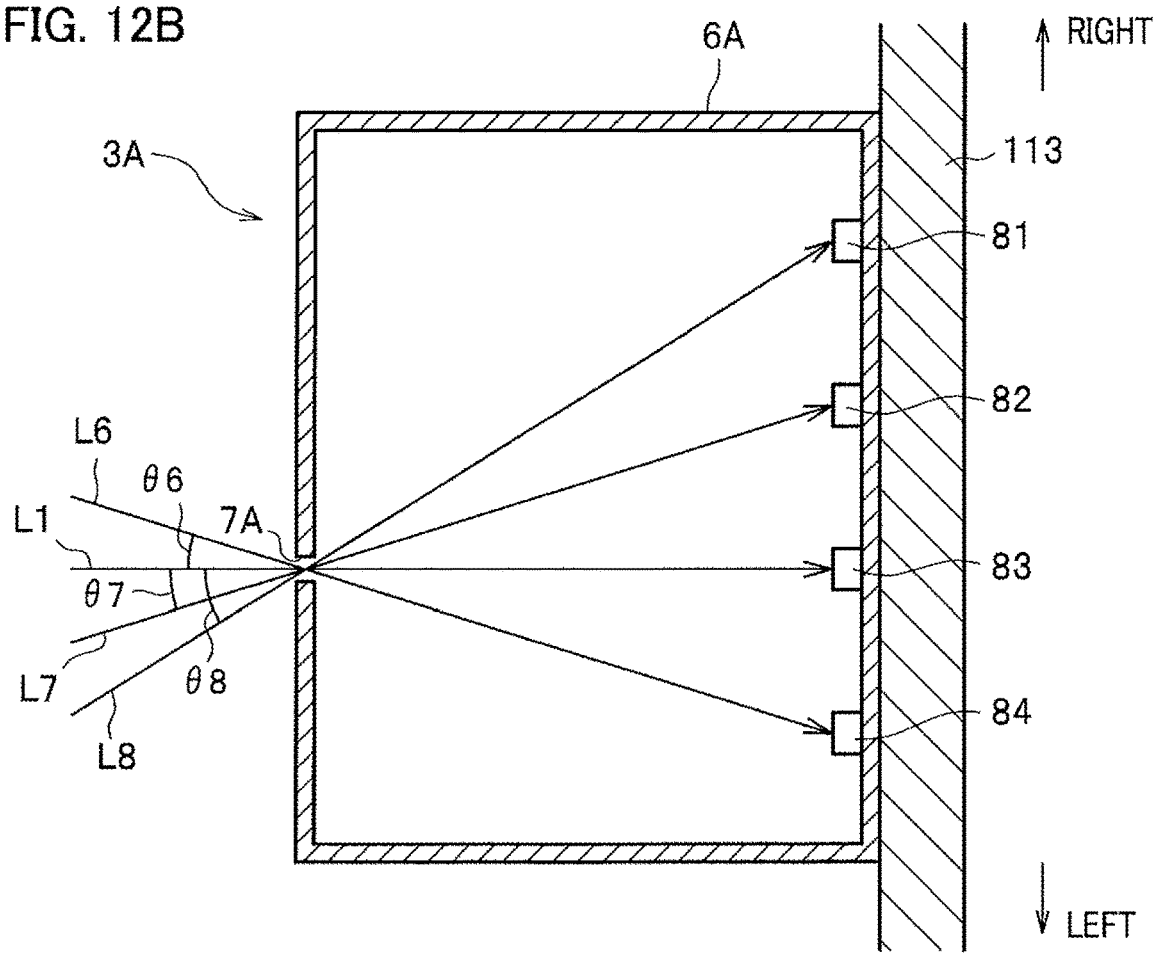
FIG. 12B is a cross-sectional view of the housing of the sensor unit according to the second embodiment, a cross-section of which is cut along the XIIB-XIIB line in FIG. 12A and viewed from the arrow direction.

As shown in FIGS. 12A and 12B, the light detecting unit 10A is provided with a plurality of light receiving elements 80.

The light receiving elements 80 are arranged in three rows in the up-down direction to correspond to the number (three rows) in the up-down direction of the liquid crystal panels 70.

On the other hand, the light receiving elements 80 are arranged in four rows in the right-left direction. Therefore, the light detecting unit 10A in the present embodiment is provided with twelve light receiving elements 80, which do not correspond to the number (eighteen) of the liquid crystal panels 70.

Note that, for convenience of explanation, groups each composed of a set of three light receiving elements 80 arranged in the up-down direction are referred to as, in order from the right, a first row 81 of group of light receiving elements, a second row 82 of group of light receiving elements, a third row 83 of group of light receiving elements, and a fourth row 84 of group of light receiving elements.

The pinhole 7A is located nearer the left, not in the central part, of the housing 6A in the vehicle width direction.

Therefore, the light L1 incident without oblique incidence in the right-left direction on the turning board 113 enters the third row 83 of group of light receiving elements.

Also, the light L6 (having the incident angle of $(90°+θ6°)$) incident obliquely on the turning board 113 from the front and right side of the turning board 113 enters the fourth row 84 of group of light receiving elements.

Moreover, the light L7 (having the incident angle of $(90°-θ7°)$) incident obliquely on the turning board 113 from the front and left side of the turning board 113 enters the second row 82 of group of light receiving elements.

Further, the light L8 (having the incident angle of $(90°-θ8°)$) incident greatly obliquely on the turning board 113 from the front and left side of the turning board 113 enters the first row 81 of group of light receiving elements.

Moreover, in the present embodiment, correspondence relation between the groups of liquid crystal panels and the groups of light receiving elements (the first row 71 of group of liquid crystal panels to the sixth row 76 of group of liquid crystal panels, and the first row 81 of group of light receiving elements to the fourth row 84 of group of light receiving elements) is as follows.

When the light L1 enters the third row 83 of group of light receiving elements, the control unit decreases a transmittance of the second row 72 of group of liquid crystal panels.

When the light L6 enters the fourth row 84 of group of light receiving elements, the control unit decreases a transmittance of the first row 71 of group of liquid crystal panels.

When the light L7 enters the second row 82 of group of light receiving elements, the control unit decreases transmittances of the third row 73 of group of liquid crystal panels and the fourth row 74 of group of liquid crystal panels.

When the light L8 enters the first row 81 of group of light receiving elements, the control unit decreases transmittances of the fifth row 75 of group of liquid crystal panels and the sixth row 76 of group of liquid crystal panels.

As described above, the second embodiment makes it possible, as shown in FIG. 10, to block the light L7 that travels near a rearview mirror 120 where a conventional sun visor cannot be disposed and thus cannot block light.

Moreover, the light L8 that travels toward the driver from the front passenger seat side, in other words, the light L8 that is conventionally blocked by a sun visor disposed on the front passenger seat side, can be blocked.

Therefore, the light shielding device 110 for the windshield according to the second embodiment allows a light shielding range to be enlarged as compared to the sun visor 1 according to the first embodiment.

Moreover, the member holding the mirror 116 thereon is the turning board 113 that is downsized as compared to the conventional sun visor. This makes it possible to reduce troublesomeness which the driver feels for the sun visor.

Although the second embodiment has been described above, the present invention is not limited to the example in which the sensor unit 3A is provided on the turning board 113.

Figure 13:
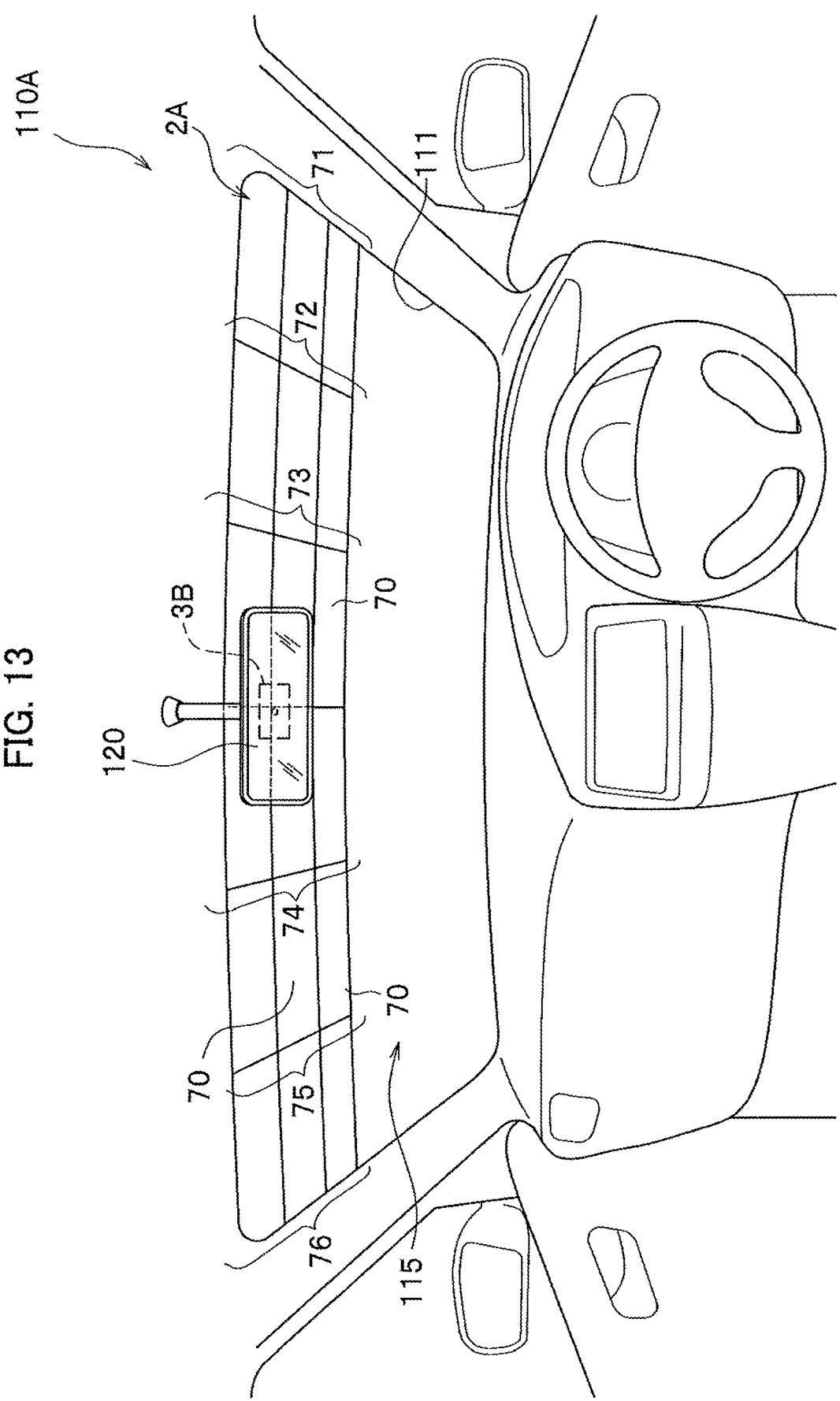
FIG. 13 is a view of a light shielding device according to a modified example of the second embodiment, which is viewed from the vehicle interior side.
Figure 14:
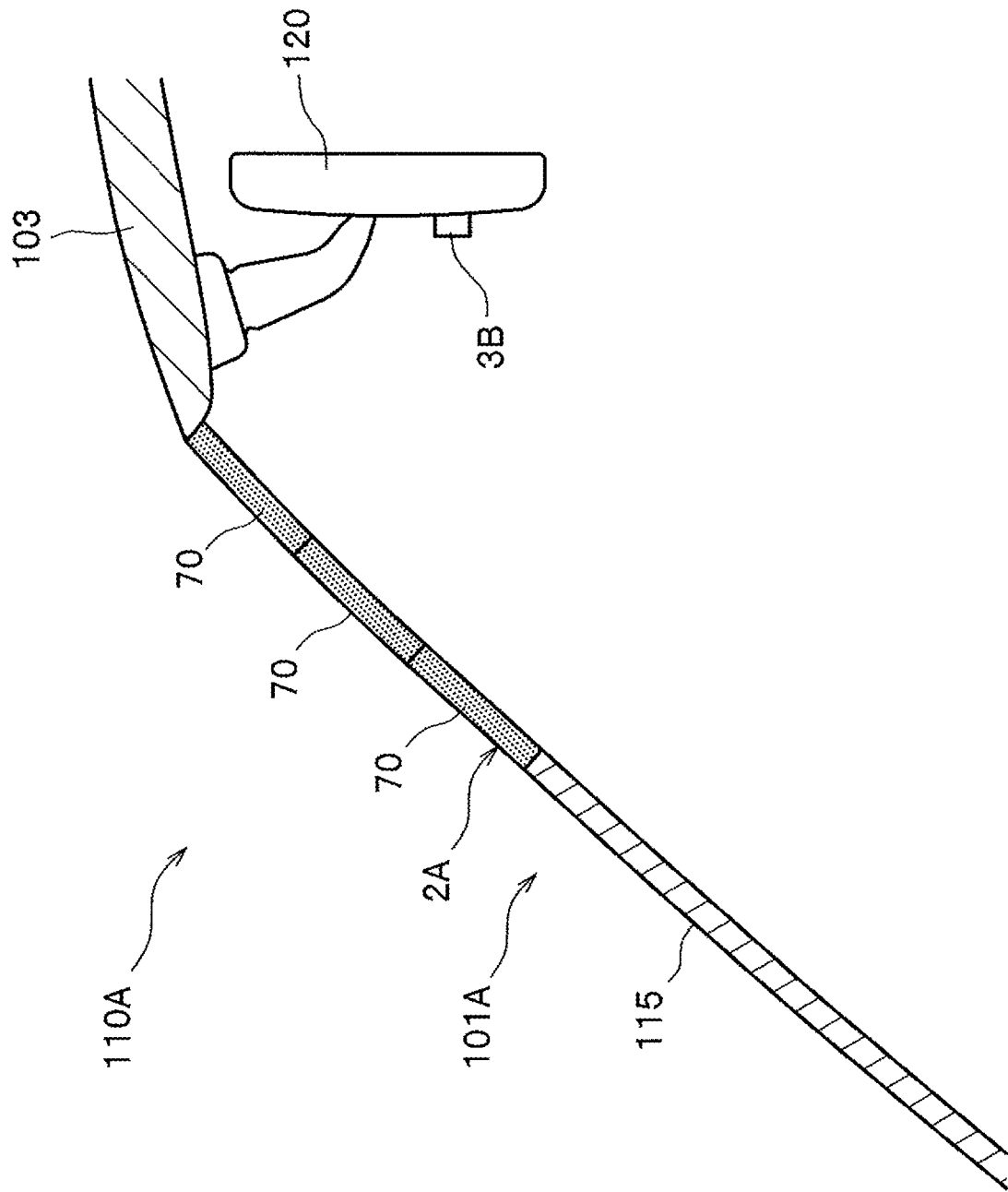
FIG. 14 is a side view of the light shielding device according to the modified example of the second embodiment, which is viewed from the left.

For example, as shown in FIG. 13 and FIG. 14, a sensor unit 3B may be provided on a front face of the rearview mirror 120. In the figures, reference 110A denotes a light shielding device for the windshield.

This eliminates the need to provide a turning board for holding the mirror. That is, troublesomeness which the driver feels for the turning board 113 can be greatly reduced.

DESCRIPTION OF REFERENCE SIGNS

1: Sun visor (Vehicular sun visor); 2: Light shielding unit; 3: Sensor unit; 5: Frame; 6: Housing; 6*a*: Front wall part; 6*b*: Rear wall part; 7: Pinhole; 10: Dimming device; 11~19: Liquid crystal panel (First liquid crystal panel~Ninth liquid crystal panel); 20: Light detecting unit; 21~29: Light receiving element (First light receiving element~Ninth light receiving element); 30,40: Liquid crystal panel; 60: Electrical circuit; 70: Liquid crystal panel; 71~76: First row of group of liquid crystal panels~Sixth row of group of liquid crystal panels; 80: Light receiving element; 81~84: First row of group of light receiving elements~Fourth row of group of light receiving elements; 100: Automobile; 101: Windshield; 102: Front seat; 110: Light shielding device for windshield

What is claimed is:

1. A light shielding device for a vehicle, comprising:
   a light shielding unit having a plurality of liquid crystal panels that receive light from outside the vehicle to enable a light transmittance thereof to be changed; and
   a sensor unit that includes:
   a housing having a front wall part and a rear wall part that is located downstream of the front wall part in a transmission direction of light;
   a pinhole formed in the front wall part; and
   a plurality of light receiving elements that are provided on the rear wall part so as to receive the light from outside of the vehicle through the pinhole from independently of the liquid crystal panels, wherein
   the light shielding unit allows the plurality of liquid crystal panels to change the light transmittance to perform light-shielding, based on light-receiving states of the plurality of light receiving elements that are associated with the liquid crystal panels wherein the front wall part and the rear wall part define an interior of the housing, the plurality of light receiving elements are provided on the rear wall part in the interior of the housing, and the liquid crystal panels are disposed external to the housing with respect to the interior of the housing; wherein a portion of the light from outside of the vehicle which passes through the pinhole and is received by the plurality of light receiving elements is not received by the liquid crystal panels, and a portion of the light from outside of the vehicle which is received by the liquid crystal panels does not pass through the pinhole to be received by the plurality of light receiving elements.

2. The light shielding device for the vehicle, according to claim 1, wherein
   the plurality of light receiving elements and the plurality of liquid crystal panels are disposed with the same number as each other in an up-down direction of the light shielding device, and
   each of the liquid crystal panels disposed in order from one side in the up-down direction is associated with each of the light receiving elements disposed in order from another side in the up-down direction.

3. The light shielding device for the vehicle, according to claim 1, wherein
   the plurality of light receiving elements and the plurality of liquid crystal panels are disposed with the same number as each other in a right-left direction of the light shielding device, and
   each of the liquid crystal panels disposed in order from one side in the right-left direction is associated with each of the light receiving elements disposed in order from another side in the right-left direction.

4. The light shielding device for the vehicle, according to claim 2, wherein
   the plurality of light receiving elements and the plurality of liquid crystal panels are disposed with the same number as each other in a right-left direction of the light shielding device, and
   each of the liquid crystal panels disposed in order from one side in the right-left direction is associated with each of the light receiving elements disposed in order from another side in the right-left direction.

5. The light shielding device for the vehicle, according to claim 1, wherein the light shielding unit is attached to a roof and constitutes a sun visor for the vehicle.

6. The light shielding device for the vehicle, according to claim 2, wherein the light shielding unit is attached to a roof and constitutes a sun visor for the vehicle.

7. The light shielding device for the vehicle, according to claim 3, wherein the light shielding unit is attached to a roof and constitutes a sun visor for the vehicle.

8. The light shielding device for the vehicle, according to claim 4, wherein the light shielding unit is attached to a roof and constitutes a sun visor for the vehicle.

9. The light shielding device for the vehicle, according to claim 1, wherein the light shielding unit is attached on an inside of a supporting frame of a windshield and constitutes a light shielding device for the windshield.

10. The light shielding device for the vehicle, according to claim 2, wherein the light shielding unit is attached on an inside of a supporting frame of a windshield and constitutes a light shielding device for the windshield.

11. The light shielding device for the vehicle, according to claim 3, wherein the light shielding unit is attached on an inside of a supporting frame of a windshield and constitutes a light shielding device for the windshield.

12. The light shielding device for the vehicle, according to claim 4, wherein the light shielding unit is attached on an inside of a supporting frame of a windshield and constitutes a light shielding device for the windshield.

13. The light shielding device for the vehicle, according to claim 1, wherein the sensor unit is attached to a rearview mirror.

14. The light shielding device for the vehicle, according to claim 2, wherein the sensor unit is attached to a rearview mirror.

15. The light shielding device for the vehicle, according to claim 3, wherein the sensor unit is attached to a rearview mirror.

16. The light shielding device for the vehicle, according to claim 4, wherein the sensor unit is attached to a rearview mirror.

17. The light shielding device for the vehicle, according to claim 1, wherein the plurality of liquid crystal panels receive the light from outside the vehicle independently of the light receiving units at a location external to the housing with respect to the interior of the housing.

* * * * *